United States Patent
Ling et al.

(10) Patent No.: US 8,478,221 B2
(45) Date of Patent: *Jul. 2, 2013

(54) METHOD AND APPARATUS FOR EFFICIENT DC CALIBRATION IN A DIRECT-CONVERSION SYSTEM WITH VARIABLE DC GAIN

(75) Inventors: Curtis Ling, Carlsbad, CA (US); Andy Lo, San Diego, CA (US); Tete Sedalo, Carlsbad, CA (US)

(73) Assignee: Maxlinear, Inc., Carlsbad, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/490,142

(22) Filed: Jun. 6, 2012

(65) Prior Publication Data

US 2012/0244826 A1 Sep. 27, 2012

Related U.S. Application Data (63) Continuation of application No. 12/243,692, filed on Oct. 1, 2008, now Pat. No. 8,229,381.

(60) Provisional application No. 60/977,299, filed on Oct. 3, 2007.

(51) Int. Cl.
  *H04B 1/06* (2006.01)
  *H04B 7/00* (2006.01)
  *H04B 1/10* (2006.01)

(52) U.S. Cl.
  USPC .............. 455/232.1; 455/233.1; 455/241.1; 455/251.1; 455/296

(58) Field of Classification Search
  USPC .............. 455/136, 138, 232.1–253.2, 296, 455/304, 310, 313–317
  See application file for complete search history.

(56) References Cited

U.S. PATENT DOCUMENTS

| | | | | |
|---|---|---|---|---|
| 6,321,073 | B1* | 11/2001 | Luz et al. | 455/239.1 |
| 6,498,929 | B1* | 12/2002 | Tsurumi et al. | 455/296 |
| 6,654,593 | B1* | 11/2003 | Simmons et al. | 455/234.1 |
| 6,735,422 | B1* | 5/2004 | Baldwin et al. | 455/232.1 |
| 6,941,121 | B2* | 9/2005 | Chen | 455/232.1 |
| 7,231,195 | B2* | 6/2007 | Nakayama | 455/251.1 |

(Continued)

OTHER PUBLICATIONS

International Search Report and Written Opinion for Application No. PCT/US2008/078611 mailed on Dec. 5, 2008, 5 pages.

(Continued)

*Primary Examiner* — Simon Nguyen
(74) *Attorney, Agent, or Firm* — Kilpatrick Townsend & Stockton LLP; Ardeshir Tabibi (57) ABSTRACT

A wireless communication receiver includes a multitude of look-up tables each storing a multitude of DC offset values associated with the gains of an amplification stage disposed in the wireless communication receiver. The entries for each look-up table are estimated during a stage of the calibration phase. During such a calibration stage, for each selected gain of an amplification stage, a search logic estimates a current DC offset number and compares it to a previous DC offset estimate that is fed back to the search logic. If the difference between the current and previous estimates is less than a predefined threshold value, the current estimate is treated as being associated with the DC offset of the selected gain of the amplification stage and is stored in the look-up table. This process is repeated for each selected gain of each amplification stage of interest until the look-up tables are populated.

20 Claims, 5 Drawing Sheets

U.S. PATENT DOCUMENTS

| | | | |
|---|---|---|---|
| 7,239,856 B2* | 7/2007 | Ahn et al. | 455/127.2 |
| 7,400,869 B2* | 7/2008 | Astrachan | 455/240.1 |
| 2002/0042256 A1* | 4/2002 | Baldwin et al. | 455/232.1 |
| 2007/0111688 A1* | 5/2007 | Ueno et al. | 455/130 |
| 2007/0248360 A1* | 10/2007 | Woolf et al. | 398/135 |
| 2007/0293180 A1* | 12/2007 | Rahman et al. | 455/296 |
| 2009/0098845 A1 | 4/2009 | Ling et al. | |

OTHER PUBLICATIONS

Non-Final Office Action for U.S. Appl. No. 12/243,692, mailed on Sep. 30, 2011, 8 pages.

Notice of Allowance for U.S. Appl. No. 12/243,692, mailed on Apr. 17, 2012, 7 pages.

\* cited by examiner

METHOD AND APPARATUS FOR EFFICIENT DC CALIBRATION IN A DIRECT-CONVERSION SYSTEM WITH VARIABLE DC GAIN

CROSS-REFERENCE TO RELATED APPLICATIONS

The present application is a continuation application of U.S. application Ser. No. 12/243,692, filed Oct. 1, 2008, which claims benefit under 35 USC 119(e) of U.S. Provisional Application No. 60/977,299, filed Oct. 3, 2007, the contents of which are incorporated herein by reference in their entirety for all purposes.

BACKGROUND OF THE INVENTION

A direct conversion receiver typically includes a mixer, a baseband filter, a baseband variable amplifier, RF variable amplifiers and an analog-to digital-converter. The main difference between a direct conversion receiver and a heterodyne receiver is that a direct conversion receiver outputs a signal centered around DC rather than around an intermediate frequency.

Figure 1:
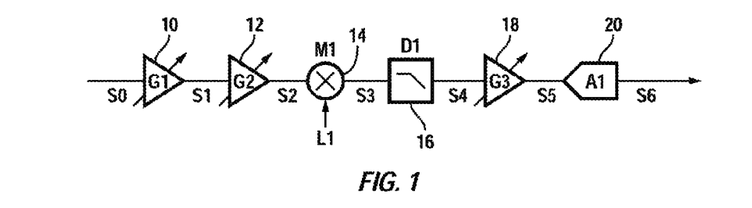
FIG. 1 is a block diagram of a typical direct conversion receiver, as known in the prior art.

FIG. 1 is a block diagram of a typical direct conversion receiver. G1 represents the gain of first RF amplifier 10. G2 represents the gain of the second RF amplifier 12. Mixer 14 provides frequency translation. Low pass filter 16 provides frequency selectivity. G3 represents the gain of the baseband amplifier 18. Analog-to-digital converter 20 converts the analog signal it receives to a digital signal.

Figure 2:
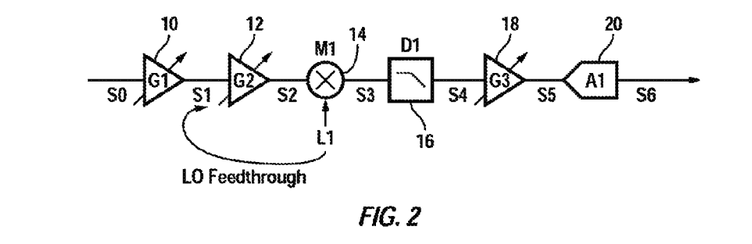
FIG. 2 shows an LO leakage causing self-mixing in a direct conversion receiver, as known in the prior art.

The finite isolation (i.e., physical separation) between signal lines S1 and L1 causes a certain amount of LO leakage in mixer 14 and which is mixed with the down-converted baseband signal to appear at the output of mixer 14, a phenomenon commonly referred to as self-mixing, as shown in FIG. 2. Thus signal S3 supplied by mixer 14 is a composite of the down-converted received waveform, DC component, and high frequency components. Such high frequency components are filtered out by filter 16.

The DC component of signal S3 may vary depending on the gain G2 of amplifier 12. Low-pass filter 16 may also introduce gain dependent DC offsets. Since ADC 20 can only handle a certain finite voltage swing, the potentially large DC offsets coming from both the RF and the baseband portion of the receiver may saturate ADC 20. Therefore, the DC offsets must be minimized before reaching the ADC 20 in order to preserve the integrity and dynamic range of the signal entering the baseband demodulator. The receiver often includes an analog front end and a baseband demodulator, as is well known. This may be achieved using conventional calibration techniques by injecting a correction factor in a signal line, such as signal line S3, to cancel out the DC offset. This process is often referred to as DC calibration or DC offset correction.

However, as gains G2 and G3 vary, the desired correction factor in general also varies. This will cause perturbations in the signal unless the signal path rapidly adjusts the correction factor as a function of these gains. This can be accomplished by using look-up tables (LUTs) which store the correction factors corresponding to different gain settings a priori.

In typical applications it is desirable to cancel DC offsets prior to the analog-to-digital-converter. In typical receivers, such as those used in television reception, two known techniques are used to handle DC offset. In accordance with the first conventional technique, shown in FIG. 3, the DC offset estimation is performed for all possible gain partitioning between G2 and G3, and the results are then stored in a look-up table (LUT) 22. LUT 22 is referenced every time the receiver changes either G2 or G3. The number of entries in LUT 22 is thus (G2×G3). Although relatively straight-forward, this technique is slow, especially as the gain ranges for G2 and G3 become large. If the DC offset estimate values are stored in hardware to improve the speed of operation, the semiconductor die size increases, thus increasing the cost.

Figure 4:
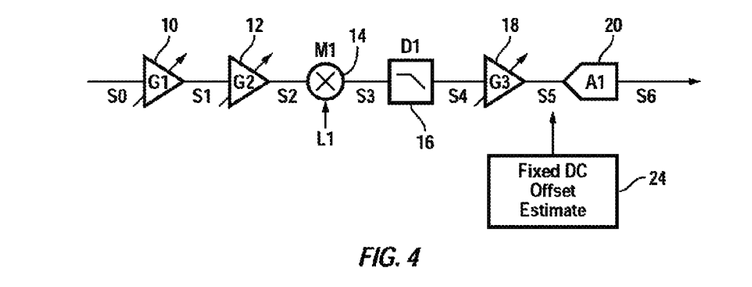
FIG. 4 shows a direct conversion receiving having disposed therein a look-up table, as known in the prior art.

Referring to FIG. 4, in accordance with a second conventional technique, DC offset estimation is performed for a fixed number of G2, G3 pairs, and stored in table 24. This technique reduces complexity in hardware but requires that the demodulator perform dynamic DC offset cancellation. Since G2 and G3 vary depending on channel conditions, it is difficult to select the right pair of G2 and G3 values that will keep the DC offset swing to a minimum value. This technique also requires the DC offsets value not to vary much with the gain.

BRIEF SUMMARY OF THE INVENTION

A direct conversion receiver, in accordance with one embodiment of the present invention includes, in part, a first look-up table configured to store a first multitude of DC offset values each being associated with a different one of a first multitude of gains of a first amplification stage, and a second look-up table configured to store a second multitude of DC offset values each being associated with a different one of a second multitude of gains of a second amplification stage.

In one embodiment, the direct conversion receiver further includes, in part, an analog-to-digital converter (ADC), a search logic responsive to the ADC and configured to estimate a current DC offset value in accordance with a first selected gain of the first amplification stage and further in accordance with a feedback signal representing a DC offset value estimated by the search logic during a previous estimation iteration, and a feedback loop responsive to the search logic and configured to supply the DC offset value estimated by the search logic during the previous iteration. The search logic is further configured to store the current estimate of the DC offset value in the first look-up table if a difference between the current estimate of the DC offset value and the previous estimate of the DC offset value is smaller than a predefined threshold value.

The search logic is further configured to estimate a second DC offset value in accordance with a first selected gain of the second amplification stage and further in accordance with a feedback signal representing an estimate of the second DC offset made during a previous estimation iteration. The search logic is further configured to store the second estimate of the DC offset value in the second look-up table if a difference between a current second estimate of the DC offset value and a previous estimate of the second DC offset value is smaller than the predefined threshold value.

In one embodiment, the direct conversion receiver further includes, in part, a first conversion block configured to convert each retrieved entry of the first look-up table to an associated 2's complement representation, a second conversion block configured to convert each retrieved entry of the second look-up table to an associated 2's complement representation, and an adder configured to sum the outputs of the first and second conversion blocks. In one embodiment, the direct conversion receiver further includes, in part, a saturation logic block adapted to saturate the output of the adder. In one embodiment, the direct conversion receiver further includes, in part, a third conversion block adapted to convert an output of the saturation logic block to an unsigned binary number. In one embodiment, the direct conversion receiver further includes, in part, a digital-to-analog converter (DAC) responsive to the third conversion block.

In one embodiment, the direct conversion receiver further includes, in part, a filter responsive to the DAC, a delay element responsive to the ADC, a third amplification stage coupled to an input of the first amplification stage, and a frequency conversion module coupled to an output of the first amplification stage.

A method of estimating DC offset in a direct conversion receiver, in accordance with one embodiment of the present invention includes, in part, storing a first group of DC offset values each associated with a different one of a first group of gains of a first amplification stage; and storing a second group of DC offset values each associated with a different one of a second group of gains of a second amplification stage.

In one embodiment, the method further includes, in part, estimating a second DC offset value in accordance with a first selected gain of the first amplification stage and further in accordance with a feedback signal representing a first estimated DC offset value estimated during a first estimation iteration, storing the second estimated DC offset in a first look-up table value if a difference between the second estimated DC offset value and the first estimated DC offset value is smaller than a predefined threshold value, and estimating a third DC offset value if the difference between the second estimated DC offset value and the first estimated DC offset value is equal to or greater than the predefined threshold value.

In one embodiment, the method further includes, estimating a fifth DC offset value in accordance with a first selected gain of the second amplification stage and further in accordance with a feedback signal representing a fourth estimated DC offset value estimated during a first estimation iteration, storing the fifth estimated DC offset value in a second look-up table if a difference between the fifth estimated DC offset value and the fourth estimated DC offset value is smaller than the predefined threshold value, and estimating a sixth DC offset value if the difference between the fifth estimated DC offset value and the fourth estimated DC offset value is equal to or greater than the predefined threshold value.

In one embodiment, the method further includes, converting each stored entry of the first look-up table to an associated 2's complement representation, converting each stored entry of the second look-up table to an associated 2's complement representation, and adding the 2's complement representations of the entries stored in the first and second look-up tables to generate a sum.

In one embodiment, the method further includes saturating the sum, converting the saturated sum to an unsigned binary number, and converting the unsigned binary number to an analog signal. In one embodiment, the method further includes, filtering the analog signal, amplifying the analog signal using the second amplification stage, converting the amplified signal to a digital signal, and delaying the digital signal. In one embodiment, the method further includes, amplifying the signal before it is supplied to the first amplification stage, and frequency converting the output of the first amplification stage.

DETAILED DESCRIPTION OF THE INVENTION

Figure 3:
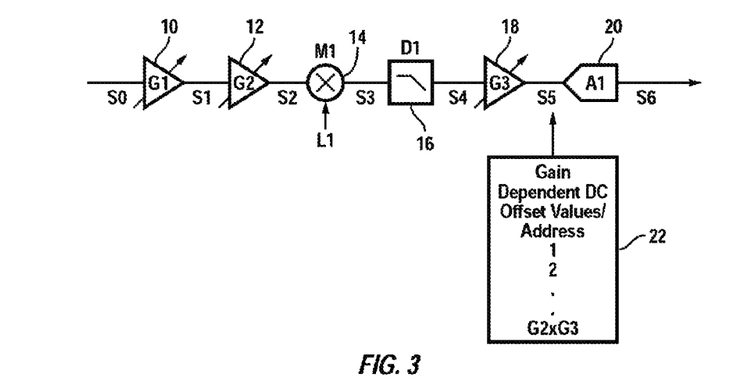
FIG. 3 shows a direct conversion receiving having disposed therein a look-up table, as known in the prior art.

In accordance with one embodiment of the present invention, the DC offsets corresponding to a number of gain combinations associated with two or more amplification stage of a wireless communication system are efficiently estimated and stored in associated look-up tables. The stored values are thereafter used during the normal operation of the receiver. In accordance with one embodiment of the present invention, the need for exhaustively determining the DC offset for every possible combination of the gains is thus dispensed with. For example, assume that the gains G2 and G3, associated with a pair of amplification stages are to be DC compensated. In accordance with one embodiment of the present invention, G2+G3 iterations and storage locations are required, thus significantly reducing the time and memory required for implementation. In contrast, a conventional system requires G2×G3 iterations of the DC calibration algorithm, as well as G2×G3 storage elements, as shown in FIG. 3.

Figure 5A:
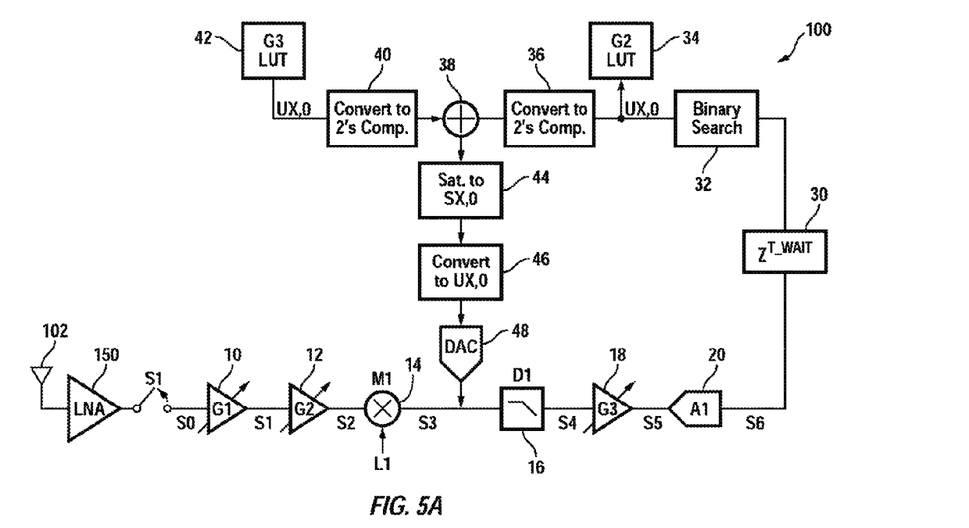
FIG. 5A is a block diagram of a system configuration used to calibrate and store the DC offset values associated with a first amplification stage during a first part of a calibration phase, in accordance with one exemplary embodiment of the present invention.

During the calibration phase, the look-up tables are populated with corresponding DC offset values associated with two or more amplification stages disposed in the receiver. FIG. 5A is a block diagram of a system configuration 100 used to calibrate and store the DC offset values associated with an amplification stage during a first part of a calibration phase, in accordance with one exemplary embodiment of the present invention. During the first part of the calibration phase, the DC offset values associated with the gains G2 of amplifier 12 are estimated and stored in LUT 34. During the second part of the calibration phase, the DC offset values associated with the gains G3 of amplifier 18 are estimated and stored in LUT 42. Amplifier 10 is assumed to have a gain of G1.

During the first part of the calibration phase, the gains G3 and G1 are set to fixed values, and gain G2 is varied across a desired range in order to enable G2 LUT 34 to be populated. In one embodiment, during the first part of the calibration phase while estimating the DC offset values associated with G2, G3 LUT 42 may be initialized to a value that corresponds to the midpoint output of DAC 20. During both the first and second calibration phases, the front-end low-noise amplifier LNA 150 is decoupled from system 100 using switch S1. This causes signal path S1 to be decoupled from antenna 102, thereby to prevent any incoming RF signals from disturbing the DC calibration.

Referring to FIG. 5A, system 100 is shown as also including, in part, a mixer 14, a low-pass filter 16, an analog-to-digital converter (ADC) 20, a delay element 30, a binary search logic block 32, LUT 34, a first conversion logic block 36 configured to convert a received binary number to its 2's complement representation, an adder 38, a saturation logic block 44, a second conversion logic block 46 configured to convert the output of saturation logic block 44 to an unsigned number, a digital-to-analog converter (DAC) 48, and a third conversion logic block 40 configured to convert the DC offset value it receives from LUT 42 to an associated 2's complement representation. Although the present invention is described with reference to a pair of LUTs each storing and supplying the DC offsets gain associated with an amplification stage, it is understood that in other embodiments, more than two LUTs, may be used, with each LUT storing and supplying data associated with a different one of more than two amplification stages.

Amplifier 12 is adapted to amplify the signal it receives from amplifier 10 and supply the amplified signal to frequency conversion module 14. Frequency conversion module 14 is shown as being a mixer in this exemplary embodiment and is adapted to convert the frequency of the signal it receives. Filter 16 is adapted to filter out the undesired spectrum of the signal it receives from mixer 14. The output signal of filter 16 is amplified by amplifier 18 and subsequently digitized by ADC 20. Delay element 30 enables the output of ADC 20 to settle before supplying it to search logic 32. Search logic 32 identifies an entry in LUT 34 associated with the binary value it receives from delay element 30. The entry so identified in LUT 34 is converted to a corresponding 2's complement representation by first conversion logic block 36 and supplied to adder 38. The initialized value of G3 stored in LUT 42 is converted to a corresponding 2's complement by the third conversion logic block 40 and supplied to adder 38.

During the first part of the calibration phase, while G1 and G3 values are maintained constant, with each new selected value for G2, a new DC offset value is added to LUT 34. This process is repeated until LUT 34 is filled. To populate LUT 34, search logic 32 estimates a DC offset number using the binary value supplied by ADC 20 and in accordance with the range that the DC offset number is expected to vary. The estimated DC offset number is fed back to search logic 32 using the feedback loop that includes first, second and third logic blocks 36, 44, 46, adder 38 and DAC 48. As is seen from FIG. 5, the output of DAC 48 is supplied to filter 16. Search logic 32 continues to modify the value it estimates until the difference between the value it estimates, and the value it receives via the feedback path falls below a predefined value. In other words, search logic 32, during each iteration, attempts to minimize the difference between the value it estimated during the previous iteration cycle and the new value it estimates until the difference between these two estimates converges and becomes less than a predefined threshold value. In one embodiment, this threshold value may be set to binary value zero. In one example, it takes 7-10 iterations, before the difference between the estimated and the fed back values becomes less than the predefined threshold value. In some embodiments, search logic 32 is configured to perform a binary search. In other embodiment, search logic 32 performs a linear search, etc.

To ensure that the sum of the numbers supplied by LUTs 34 and 42, as generated by adder 38, does not exceed the bit-width of DAC 48 when DAC 48 is a true binary DAC, the values supplied by LUTs 34 and 42 are first converted to their associated 2's complement representations. First conversion block 36 converts the binary data it receives from LUT 34 to an associated 2's complement form. Likewise, third conversion block 40 converts the binary data it receives from LUT 42 to an associated 2's complement form. Adder 38 is configured to add the outputs of conversion blocks 36, 40 and to deliver this sum to saturation logic 44. Saturation logic 44 saturates this binary sum by ensuring that it does not include more bits than the numbers it receives. For example, assume that each of the conversion blocks 36 and 40 supplies a 4-bit number. The sum of these two numbers, as generated by adder 38, may exceed 4 bits and cause DAC 48 not to operate properly. To inhibit this, saturation logic 44 maintains the sum it receives from adder 38 by, for example, limiting the maximum value that adder 38 may generate, or by discarding the carry-over bit. For example, if each of conversion blocks 36 and 40 is a 4-bit logic block, their sum generated by adder 38 is maintained at a maximum of binary number of 1111. The output of saturation logic block 44 is supplied to a third conversion block 46 to be converted to an unsigned binary number to enable DAC 48 to handle the result of the operation.

Figure 5B:
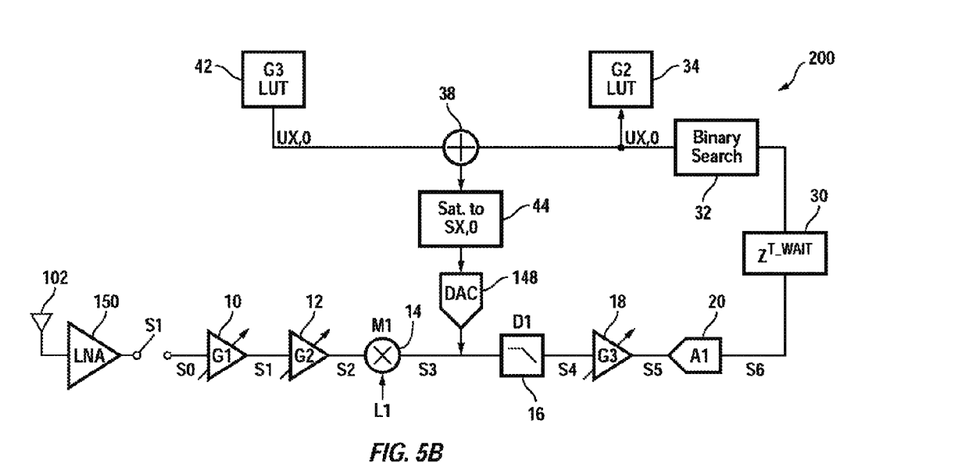
FIG. 5B is a block diagram of a system configuration used to calibrate and store the DC offset values associated with a first amplification stage during a first part of a calibration phase, in accordance with another exemplary embodiment of the present invention.

FIG. 5B is a block diagram of a system configuration 200 used to calibrate and store the DC offset values associated with amplification stage 12 during a first part of a calibration phase, in accordance with another exemplary embodiment of the present invention. System configuration 200 is similar to system configuration 100 except that DAC 148 in system configuration 200 is a 2's complement DAC type. Accordingly, system 200 does not include any logic block to convert the entries stored in LUTs 34 and 42 to their respective 2's complement representations. System 200 also dispenses the need for a logic block to convert the signed binary numbers to unsigned binary numbers.

Figure 6A:
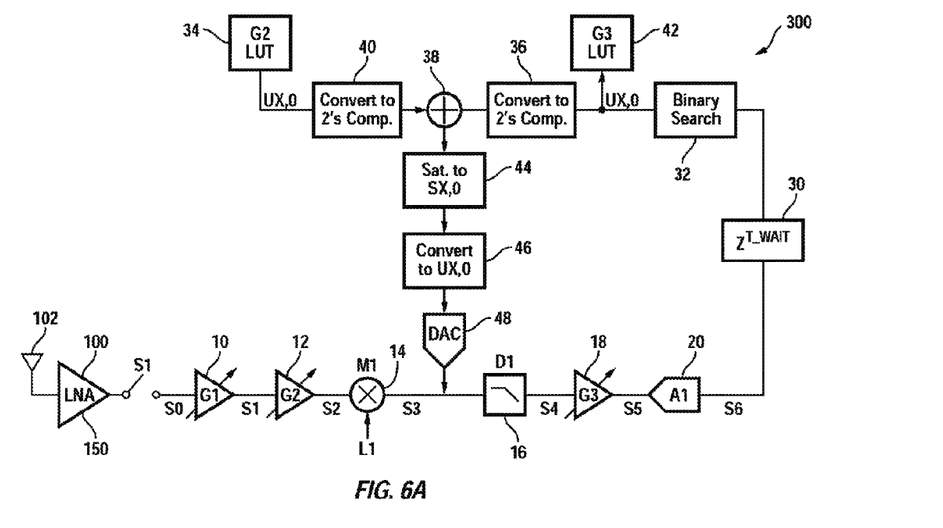
FIG. 6A is a block diagram of a system configuration used to calibrate and store the DC offset values associated with a second amplification stage during a second part of a calibration phase, in accordance with one exemplary embodiment of the present invention.

FIG. 6A is a block diagram of a system configuration 300 used to calibrate and store the DC offset values associated with amplifier 18 during a second part of a calibration phase, in accordance with one exemplary embodiment of the present invention. System 300 is similar to system 100 except that in system 300, the DC offset values obtained by varying G3 values are used to populate LUT 42. Accordingly, in system 300, LUT 42 is coupled between search logic 32 and first conversion logic block 36. During the second part of the calibration phase, the gains G2 and G1 are set to fixed values, and gain G3 is varied across a desired range. For the selected constant value of G2, and each of the multitude of selected values of G3, an entry is stored in LUT 42. Each entry in LUT 42 corresponds to a DC offset correction number associated with a different value of gain G3.

Figure 6B:
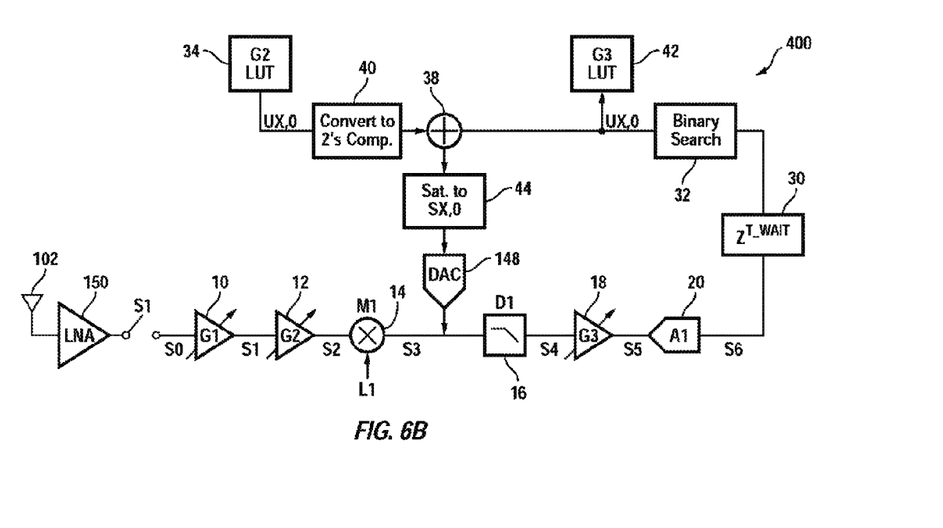
FIG. 6B is a block diagram of a system configuration used to calibrate and store the DC offset values associated with a second amplification stage during a second part of a calibration phase, in accordance with another exemplary embodiment of the present invention.

FIG. 6B is a block diagram of a system configuration 400 used to calibrate and store the DC offset values associated with amplifier 18 during a second part of a calibration phase, in accordance with another exemplary embodiment of the present invention. System configuration 400 is similar to system configuration 300 except that DAC 148 in system configuration 400 is a 2's complement DAC type. Accordingly, system 400 does not include any logic block to convert the entries stored in LUTs 34 and 42 to their respective 2's complement representations. System 400 also dispenses the need for a logic block to convert the signed binary numbers to unsigned binary numbers.

As described above, LUT 34 is populated (filled) with DC offset correction numbers associated with gains G2 while gain G3 (and its LUT 42 pointer) is maintained at an arbitrary constant value, e.g., at its maximum gain value. Thereafter, LUT 42 is filled with DC offset correction numbers associated with gains G3 while gain G2 (and its LUT 34 pointer) is maintained at an arbitrary constant value. It is understood that the order in which the LUTs 34 and 42 are filled may be changed. Furthermore, additional gain stages may be accommodated in a similar manner using more tables and calibration phases. The number of bits used in DAC 48 may depend on a number of factors, such as the magnitude of the DC offset present in the receiver.

Figure 7:
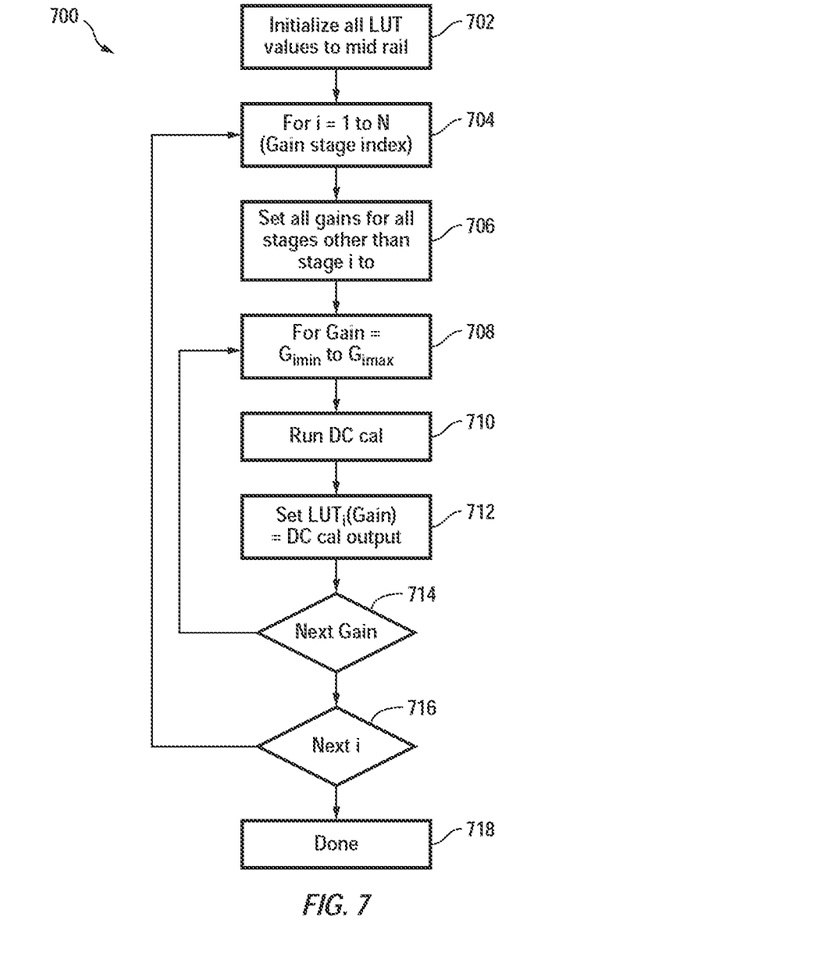
FIG. 7 is a flowchart of steps carried out to store DC offset values in a multitude of look-up tables during a calibration phase, in accordance with one embodiment of the present invention.

FIG. 7 is a flowchart 700 of steps carried out to store DC offset values in a multitude of LUTs during a calibration phase, in accordance with one embodiment of the present invention. The LUT entries are initialized 702 to known values, such as to the mid operating point of a DAC. To generate 704 DC offset calibration values associated with amplification (gain) stage i, the gain of all other stages are set 706 to known values. These known values may be the maximum gains of their respective stages in some embodiments. The gain of amplification stage i being calibrated is subsequently changed incrementally from a minimum value to a maximum value 708. For each gain of stage i, the calibration process is carried out 710 to iteratively estimate a corresponding DC offset value. After the estimated DC offset value satisfies a predefined condition, it is stored 712 in an associated LUT entry. Thereafter, the gain of stage is changed 714 and the process is repeated until for each gain of stage i an entry is stored in the associated LUT i. The calibration then continues 716 to the next stage i+1 and the process is repeated until a DC offset value associated with each selected gain of each amplification stage is estimated and stored in a corresponding LUT entry.

Figure 8:
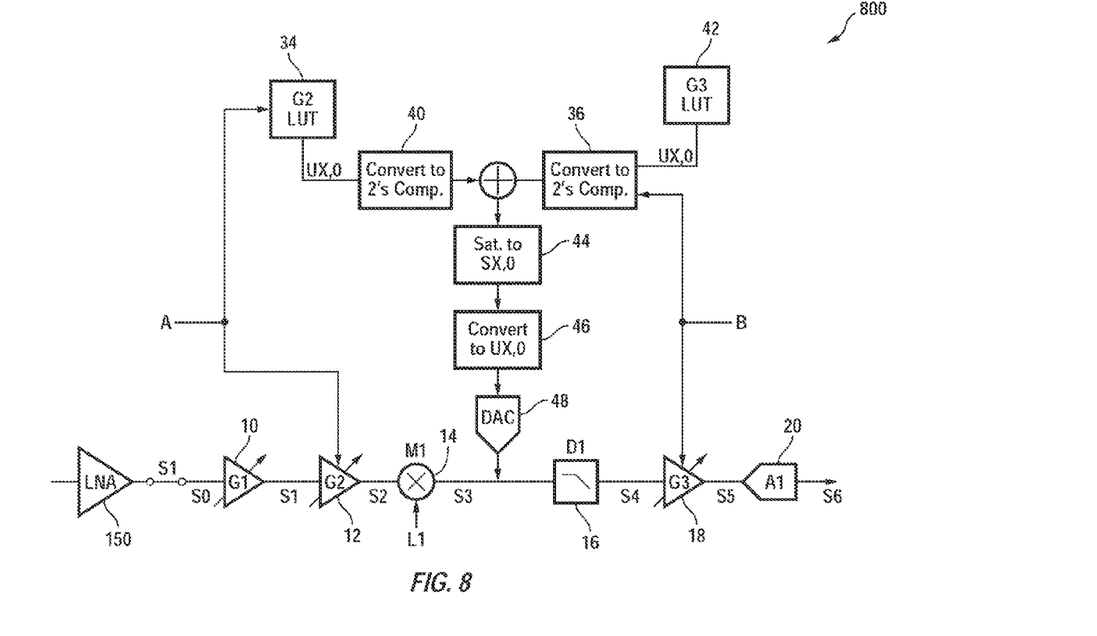
FIG. 8 is a number of blocks of a wireless communication receiver, in accordance with one embodiment of the present invention.

FIG. 8 is a block diagram of a portion of a receiver, in accordance with one embodiment of the present invention. LUTs 34 and 42 contain estimated DC offset values associated respectively with amplification stages 12 and 18. The entries in LUTs 34 and 42 are stored during a DC offset calibration phase, as described in detail above. Following the calibration phase, front-end LNA 150 is coupled to amplifier 10 via switch S1. For each gain of amplifier 12, selected in accordance with signal A, a corresponding DC offset value is retrieved from LUT 34 and delivered to conversion logic block 40. In other words, as the gain of amplifier 12 varies using signal A, a different value is retrieved from LUT 34 to compensate for any resulting DC offset change caused by the varied gain of amplifier 12. Likewise, for each gain of amplifier 18, selected in accordance with signal B, a corresponding DC offset value is retrieved from LUT 42 and delivered to conversion logic block 36. In other words, as the gain of amplifier 18 varies using signal B, a different value is retrieved from LUT 42 to compensate for any resulting DC offset change caused by the varied gain of amplifier 18.

The DC offset value retrieved from LUT 34 is converted to its 2's complement representation using logic conversion block 40. Likewise, the DC offset value retrieved from LUT 42 is converted to its 2's complement representation using logic conversion block 36. Adder 38 sums the outputs of logic blocks 36 and 40 and supplies this sum to saturation block 44. The saturated sum supplied by saturation block 44 is converted to an unsigned binary number and delivered to DAC 48. DAC 48 converts the received unsigned number to an analog signal and supplies it to signal path S3 that couples mixer 14 to filter 16.

The above embodiments of the present invention are illustrative and not limiting. Various alternatives and equivalents are possible. The invention is not limited by the number of amplification stages or look-up tables. The invention is not limited by the type of integrated circuit in which the present disclosure may be disposed. Nor is the disclosure limited to any specific type of process technology, e.g., CMOS, Bipolar, or BICMOS that may be used to manufacture the present disclosure. Other additions, subtractions or modifications are obvious in view of the present disclosure and are intended to fall within the scope of the appended claims.

What is claimed is:

1. A direct conversion receiver comprising:
    a first look-up table configured to store a first plurality of DC offset values each being associated with a different one of a first plurality of gains of a first amplification stage; and
    a second look-up table configured to store a second plurality of DC offset values each being associated with a different one of a second plurality of gains of a second amplification stage,
    wherein the first and second amplification stages are connected in series in a same signal path.

2. The direct conversion receiver of claim 1 further comprising:
    an analog-to-digital converter (ADC);
    a search logic responsive to the ADC and configured to estimate a current DC offset value in accordance with a first selected gain of the first amplification stage and further in accordance with a feedback signal representing a DC offset value estimated by the search logic during a previous estimation iteration; and
    a feedback loop responsive to the search logic and configured to supply the DC offset value estimated by the search logic during the previous iteration, said search logic further configured to store the current estimate of the DC offset value in the first look-up table if a difference between the current estimate of the DC offset value and the previous estimate of the DC offset value is smaller than a predefined threshold value.

3. The direct conversion receiver of claim 2 wherein said search logic is further configured to estimate a second DC offset value in accordance with a first selected gain of the second amplification stage and further in accordance with a feedback signal representing an estimate of the second DC offset made during a previous estimation iteration, said search logic further configured to store the second estimate of the DC offset value in the second look-up table if a difference between a current second estimate of the DC offset value and a previous estimate of the second DC offset value is smaller than the predefined threshold value.

4. The direct conversion receiver of claim 3 further comprising:
    an adder coupled to the first and second look-up tables and adapted to add entries stored in the first and second look-up tables to generate a sum.

5. The direct conversion receiver of claim 4 further comprising:
    a saturation logic block adapted to saturate the sum.

6. The direct conversion block of claim 5 further comprising:
    a digital-to-analog converter (DAC) adapted to convert the sum to an analog signal.

7. The direct conversion block of claim 6 further comprising:
    a filter responsive to the DAC.

8. The direct conversion block of claim 7 further comprising:
a delay element responsive to the ADC.

9. The direct conversion block of claim 8 further comprising:
a third amplification stage coupled to an input of the first amplification stage; and
a frequency conversion module coupled to an output of the first amplification stage and adapted to generate a frequency converted signal.

10. The direct conversion block of claim 9 further comprising:
a first control signal coupled to the first amplification stage and the first look-up table and adapted to set a gain of the first amplification stage and select an associated DC offset value stored in the first look-up table to be applied to the frequency converted signal; and
a second control signal coupled to the second amplification stage and the second look-up table and adapted to set a gain of the second amplification stage and select an associated DC offset value stored in the second look-up table to be applied to the frequency converted signal.

11. A method of estimating a DC offset in a direct conversion receiver, the method comprising:
storing a first plurality of DC offset values each associated with a different one of a first plurality of gains of a first amplification stage; and
storing a second plurality of DC offset values each associated with a different one of a second plurality of gains of a second amplification stage,
wherein the first and second amplification stages are connected in series in a same signal path.

12. The method of claim 11 further comprising:
estimating a second DC offset value in accordance with a first selected gain of the first amplification stage and further in accordance with a feedback signal representing a first estimated DC offset value estimated during a first estimation iteration;
storing the second estimated DC offset in a first look-up table value if a difference between the second estimated DC offset value and the first estimated DC offset value is smaller than a predefined threshold value; and
estimating a third DC offset value if the difference between the second estimated DC offset value and the first estimated DC offset value is equal to or greater than the predefined threshold value.

13. The method of claim 12 further comprising:
estimating a fifth DC offset value in accordance with a first selected gain of the second amplification stage and further in accordance with a feedback signal representing a fourth estimated DC offset value estimated during a first estimation iteration;
storing the fifth estimated DC offset value in a second look-up table if a difference between the fifth estimated DC offset value and the fourth estimated DC offset value is smaller than the predefined threshold value; and
estimating a sixth DC offset value if the difference between the fifth estimated DC offset value and the fourth estimated DC offset value is equal to or greater than the predefined threshold value.

14. The method of claim 13 further comprising:
adding entries stored in the first and second look-up tables to generate a sum.

15. The method of claim 14 further comprising:
saturating the sum.

16. The method of claim 15 further comprising:
converting the sum to an analog signal.

17. The method of claim 16 further comprising:
filtering the analog signal.

18. The method of claim 17 further comprising:
amplifying the analog signal using the second amplification stage;
converting the amplified signal to a digital signal; and
delaying the digital signal.

19. The method of claim 18 further comprising:
amplifying an RF signal before it is supplied to the first amplification stage; and
frequency converting an output signal of the first amplification stage to a frequency converted signal.

20. The method of claim 19 further comprising:
applying a DC offset value stored in the first look-up table to the frequency converted signal in response to a gain setting of the first amplification stage; and
applying a DC offset value stored in the second look-up table to the frequency converted signal in response to a gain setting of the second amplification stage.

* * * * *